(12) United States Patent
Nichols et al.

(10) Patent No.: US 7,790,042 B2
(45) Date of Patent: *Sep. 7, 2010

(54) METHOD FOR THE REMOVAL OF SUBMICRON PARTICULATES FROM CHLORINATED WATER BY SEQUENTIALLY ADDING A CATIONIC POLYMER FOLLOWED BY ADDING AN ANIONIC POLYMER

(75) Inventors: Everett J. Nichols, Edmonds, WA (US); Jeffrey F. Williams, Langley, WA (US); James R. Scott, Bellevue, WA (US); Christine M. Palczewski, Tallahassee, FL (US)

(73) Assignee: HaloSource, Inc., Bothell, WA (US)

( * ) Notice: Subject to any disclaimer, the term of this patent is extended or adjusted under 35 U.S.C. 154(b) by 348 days.

This patent is subject to a terminal disclaimer.

(21) Appl. No.: 11/355,240

(22) Filed: Feb. 15, 2006

(65) Prior Publication Data

US 2006/0196834 A1    Sep. 7, 2006

Related U.S. Application Data

(60) Provisional application No. 60/653,654, filed on Feb. 15, 2005.

(51) Int. Cl.
C02F 1/54 (2006.01)
C02F 103/42 (2006.01)

(52) U.S. Cl. .................. 210/721; 210/727; 210/730; 210/734

(58) Field of Classification Search .............. 210/727
See application file for complete search history.

(56) References Cited

U.S. PATENT DOCUMENTS

| | | | |
|---|---|---|---|
| 3,377,274 A | | 4/1968 | Burke et al. |
| 3,617,568 A | * | 11/1971 | Ries, Jr. .................. 210/727 |
| 4,018,678 A | * | 4/1977 | Peniston et al. .......... 210/679 |
| 5,204,452 A | | 4/1993 | Dingilian et al. |
| 5,336,415 A | | 8/1994 | Deans |
| 5,362,717 A | | 11/1994 | Dingilian et al. |
| 5,433,865 A | * | 7/1995 | Laurent .................. 210/727 |
| 5,543,056 A | | 8/1996 | Murcott et al. |
| 5,681,475 A | * | 10/1997 | Lamensdorf et al. ....... 210/666 |
| 6,248,369 B1 | * | 6/2001 | Nier et al. .................. 424/637 |
| 6,409,926 B1 | | 6/2002 | Martin |
| 6,749,746 B2 | | 6/2004 | Mokrzycki |
| 6,821,427 B2 | | 11/2004 | Macpherson et al. |
| 6,827,874 B2 | | 12/2004 | Souter et al. |
| 7,030,163 B2 | * | 4/2006 | Duneas .................. 514/635 |

(Continued)

OTHER PUBLICATIONS

Nichols, E.J., "Chitosan: Chemistry and Use in Water Clarification," *Proceedings of the 2nd Annual Chemistry Symposium*, National Spa and Pool Institute, 1997, pp. 19-25.

*Primary Examiner*—Peter A Hruskoci
(74) *Attorney, Agent, or Firm*—Christensen O'Connor Johnson Kindness PLLC

(57) ABSTRACT

A method for removing submicron colloidal particulates, such as hydrocarbons, from water. The method includes first adding a soluble, cationic polymer, such as chitosan, a salt, or solution of chitosan to water containing the submicron particulates and a halogenating agent, followed by adding a soluble, anionic polymer or anionic salt to the water. The resulting flocs are filtered to remove the submicron particulates.

30 Claims, 1 Drawing Sheet

U.S. PATENT DOCUMENTS

| | | | |
|---|---|---|---|
| 7,157,009 B2 * | 1/2007 | Nichols et al. | 210/721 |
| 7,238,287 B2 * | 7/2007 | Kulperger | 210/632 |
| 7,374,690 B2 * | 5/2008 | Reddy | 210/708 |
| 7,384,573 B2 * | 6/2008 | Brummett | 252/181 |
| 2005/0242043 A1 | 11/2005 | Nichols et al. | |

* cited by examiner

METHOD FOR THE REMOVAL OF SUBMICRON PARTICULATES FROM CHLORINATED WATER BY SEQUENTIALLY ADDING A CATIONIC POLYMER FOLLOWED BY ADDING AN ANIONIC POLYMER

CROSS-REFERENCE TO RELATED APPLICATION

This application claims the benefit of U.S. Provisional Application No. 60/653,654, filed Feb. 15, 2005, incorporated herein by reference in its entirety.

FIELD OF THE INVENTION

Submicron particulates are removed from water containing a halogenating agent with the addition of a soluble, cationic polymer, followed by the addition of a soluble, anionic polymer or anionic salt. The resulting flocs are then filtered to remove the submicron particulates from the water.

BACKGROUND

A variety of filters and filter media are used to clarify water in swimming pools, water parks, hot tubs, and spas. Sand filters are common for swimming pools and municipal water treatment. Diatomaceous earth filters are also used in swimming pools and water parks. Cartridge filters utilize a synthetic fabric enclosed in a plastic cartridge. The different filter media remove different sized particles. Sand filters are capable of removing particles of 20-25 microns, while cartridge filters are typically capable of removing particles of 5-10 microns. Diatomaceous earth filters remove particles of 1-3 microns, but have to be replaced frequently. Currently, there is no efficient method that can remove submicron (<1 micron) particulates from swimming pools.

Chitosan is known for use as a pool water clarifier. Chitosan is sold under the designation SEA-KLEAR by Vanson Halosource, Inc. of Redmond Wash.

U.S. Pat. No. 5,543,056 to Murcott et al. describes a method for the treatment of drinking water that treats the water with chitosan as a primary coagulant, and bentonite as a coagulant aid. Bentonite is a fine-grained inorganic clay of the mineral montmorillonite. Clays are hydrated aluminosilicates of calcium, sodium, magnesium, and iron. Murcott et al. describes the use of chitosan and bentonite as a substitute for aluminum sulfate with or without polymer, for the removal of particulates, color, and turbidity. Murcott et al. uses chitosan and bentonite for the removal of particulates from 2 microns to greater than 50 microns, but does not describe the removal of submicron particulates. Clays are insoluble in water, and their insolubility can lead to clogged filters and sediment throughout the system. Therefore, clays are not used in pools, hot tubs, and spas.

Nichols, in *Chitosan: Chemistry and Use In Water Clarification*, National Spa and Pool Institute Chemistry Symposium (1997), describes the use of chitosan for the removal of nonpolar hydrocarbons, such as those present in skin creams, moisturizers, and suntan lotions. The removal of oils with chitosan is believed to be due to the ability of chitosan to form the halogenated derivative N-halochitosan. However, while Nichols describes the removal of some oils, Nichols does not describe the removal of submicron particulates that can be obtained with the addition of a second coagulant aid, following the addition of chitosan, as in the present invention.

Accordingly, there is a need for a method for removing submicron particulates that can take advantage of existing filtration technology such as sand, diatomaceous earth or synthetic cartridge filters to provide clear water for recreation.

SUMMARY

The present invention relates to a method of removing submicron particulates from water containing a halogenating agent. The method includes adding a soluble, cationic polymer to water containing submicron particulates and a halogenating agent, followed by adding a soluble, anionic polymer or anionic salt. Preferably, the second anionic polymer or salt is added after dispersing the first cationic polymer in the water. Adding a soluble, cationic polymer to the water containing the submicron particulates and a halogenating agent, followed by adding a soluble, anionic polymer or anionic salt will result in flocs of the submicron particulates. The flocs of submicron particulates, first and second polymers are then removed from the water by filtering the water in conventional filters to thereby remove the submicron particulates from the water. The preferred cationic polymer is chitosan, chitosan salt, or a solution thereof.

The method according to the invention is particularly useful in water that is currently being treated with a halogenating agent, so that the addition of a soluble, cationic polymer is supplemental and subsequent to treatment with a halogenating agent. Treating water in a manner according to the invention will result in the flocculation of submicron particulates into flocs that can then be removed with the use of conventional filters. Water for clarification according to the invention can come from swimming pools, water parks, hot tubs, spas, and any potable or nonpotable water source that has a halogenating agent. Typically, most water treatment installations will already include a filter. However, the filter alone is incapable of removing submicron particulates. Treating the water in accordance with the invention, will result in flocs that cannot pass through the filter, thereby trapping the flocs so as to remove the submicron particulates from the water. The removal of submicron particulates will result in clearer water than is otherwise possible with chitosan alone.

Another aspect of the present invention is a water clarifying kit that includes a first and second treatment chemical in a first and second container. The first treatment chemical may include a soluble, cationic polymer, and the second treatment chemical may include a soluble, anionic polymer or anionic salt. The kit may further include instructions for clarifying water by removing submicron particulates from the water, such as from swimming pools, spas, hot tubs, and the like, containing chlorine. The instructions may further provide directions on the use of the first and second treatment chemicals, such as providing the time to wait before adding the second treatment chemical, following addition of the first treatment chemical. The preferred first chemical may include chitosan or chitosan salt, such as chitosan acetate.

DESCRIPTION OF THE DRAWINGS

The foregoing aspects and many of the attendant advantages of this invention will become more readily appreciated as the same become better understood by reference to the following detailed description, when taken in conjunction with the accompanying drawing, wherein:

The FIGURE is a graph of a representative example showing the reduction in turbidity as a function of time.

DETAILED DESCRIPTION

Figure 1:
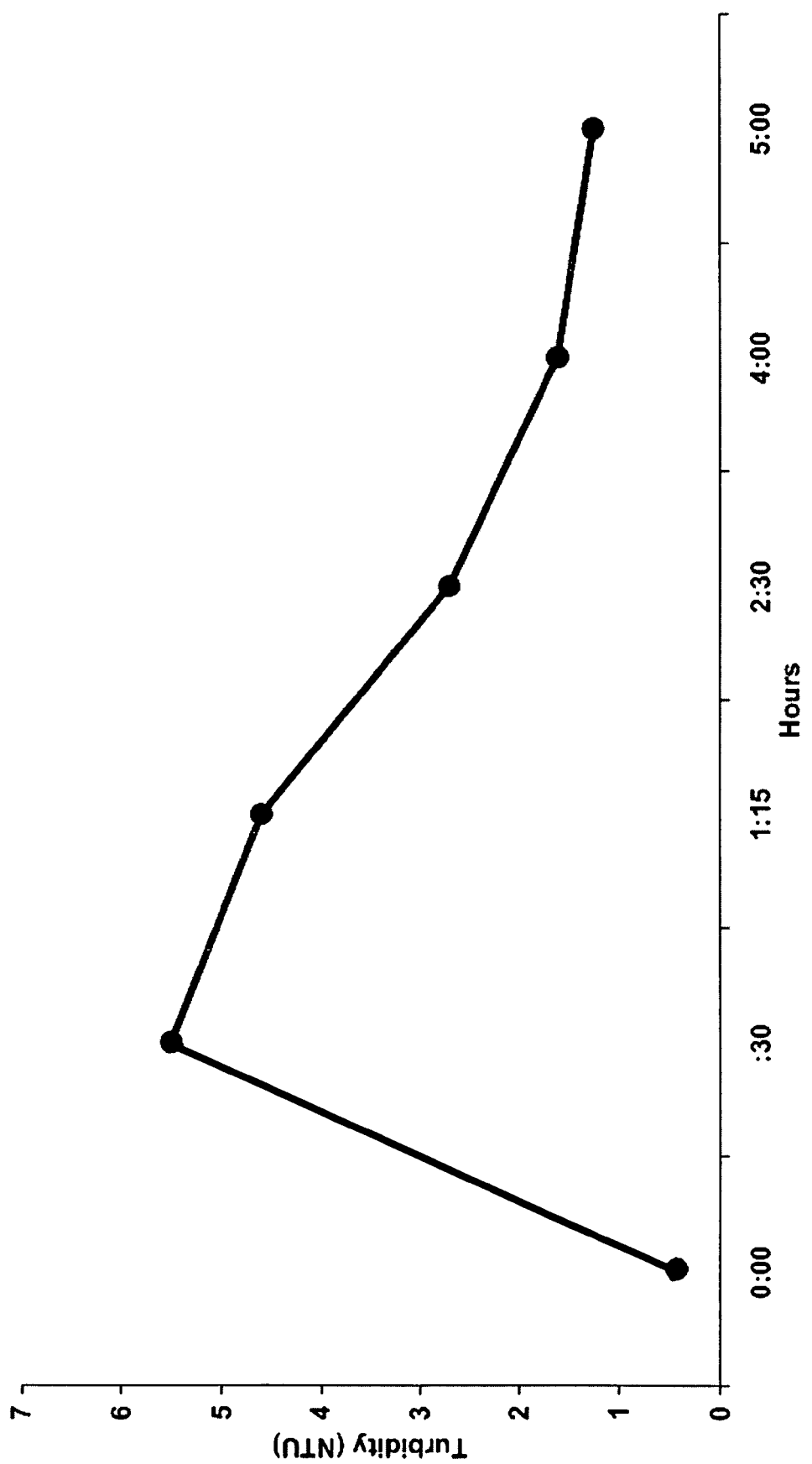

According to the present invention, submicron particulates are removed from halogenated water by the addition of a soluble, cationic polymer, followed by the addition of a soluble, anionic polymer or anionic salt to form flocs containing the submicron particulates. The flocs containing submicron particulates are of sufficient size such that the flocs can be filtered in conventional filters to thereby remove the submicron particulates from the water. The present invention provides stabilized flocs of submicron particulates, including oils, nonpolar hydrocarbons, amphoteric hydrocarbons, and polar hydrocarbons, such as those present in skin creams, moisturizers, and suntan lotions. According to the invention, a primary coagulant is added to chlorinated water, the primary coagulant is allowed to disperse in the water, followed by adding a secondary coagulant aid to the water, for the removal of submicron particulates from the water. The primary coagulant may include soluble, cationic polymers, and the coagulant aid may include soluble, anionic polymers or anionic salts.

Coagulation and flocculation followed by filtration can be utilized in the treatment of recreational water to remove suspended microscopic particles. Non-filterable suspended microscopic particles tend to possess an electrostatic charge that prevents the particles from aggregating into larger filterable aggregates due to charge-charge repulsion. This can be often overcome through the use of coagulants and flocculants. Coagulants are chemicals that when dissolved in water, form ions of charge opposite to that of the suspended particles. The charge interaction of the coagulant with the particles results in the reduction of the particle's charge or zeta potential. Reduction of the particle's zeta potential reduces particles' charge-charge repulsion and allows the particles to come sufficiently close together to form aggregates large enough to be filtered. The most commonly used coagulants are metal salts, such as aluminum sulfate and ferric chloride and their use is highly dependent on both pH and dosage.

Flocculants are typically water soluble or water dispersible, high molecular weight, polyelectrolytes, long-chain polymers composed of repeating monomeric units that can be categorized into inorganic or organic compounds. The inorganic polyelectrolytes are polymerized metal salts and include polyaluminum hydroxychloride, polyaluminum silicate sulfate, and polyaluminum sulfate. Organic polyelectrolyte flocculants are derived synthetically or obtained from natural sources. The organic polyelectrolytes can exist as charged or uncharged polymers depending on their composition. Flocculants, when added to water containing aggregates of microscopic particles or non-aggregated particles, exhibit the ability to bind and gather the particles or particle aggregates into even larger aggregates that can be easily filtered. The success of this aggregation is dependent on a variety of properties unique to the particles or particle aggregates and the properties of the particular flocculant being used. The stability of the flocculated particles or aggregated particles can be important to successful removal by filtration. Unstable flocculated particles or particle aggregates may come apart during filtration and pass through the filter while only the more stable aggregates are retained. Aggregate stability can be influenced by the flow rate and pressure across the filter and the turbulence of the water. The present invention provides stabilized flocs containing submicron particulates that can be removed through filtration.

A soluble, cationic polymer for use in the present invention may include a soluble, cationic polysaccharide. Polysaccharides suitable for use in the composition according to the invention include, but are not limited to chitosan, guar, hydroxypropyl guar and starch. A "cationic polysaccharide" is a polysaccharide having positively charged sites. The cationic charge on the cationic polysaccharide may be derived from ammonium groups, bound transition metals, and other positively charged functional groups. Chitosan is believed to be the only naturally occurring cationic polysaccharide. Guar, hydroxypropyl guar, and starch are not naturally charged. However, guar, hydroxypropyl guar, and starch may be "cationized" by chemical quaternization (alkoxylation with a quaternary epoxide). The process can be performed on other types of polysaccharides besides guar, hydroxypropyl guar, and starch. Chitosan may be available from Vanson HaloSource, Inc. Cationic starch may be available from suppliers, such as AE Staley. Cationic guar may be available from suppliers, such as Hercules or Multi-Chem Corporation.

The term "chitosan" as used herein refers to a copolymer having greater than 65% by weight of 2-deoxy-2-aminoglucose monomeric units with the remainder of the monomeric units being 2-deoxy-2-acetamidoglucose units. Chitosan is derived from chitin by hydrolysis of some 2-deoxy-2-acetamidoglucose units to 2-deoxy-2-aminoglucose units. Due to the presence of free amino groups, chitosan is soluble in aqueous acidic solutions and is present in such media as a polycation with some of the protonated amino groups bearing a positive charge. One embodiment of a chitosan solution comprising chitosan and glacial acetic acid for use as the soluble, cationic polymer in the method according to the invention is known under the designation SEA-KLEAR, and is available from Vanson Halosource, Inc. of Redmond Wash.

Alternatively, a soluble, cationic polymer may include a polyacrylamide, such as polydimethyldiallyl ammonium chloride, alkyldimethylbenzyl ammonium chloride, alkyltrimethyl ammonium chloride, and alkyldimethylethyl ammonium chloride. A suitable soluble, cationic polymer is available from Cytec under the designation SUPERFLOC (C-series) MMF.

Alternatively, a soluble, cationic polymer may include a compound having a quaternary amine group.

The term "halogenating agent" as used herein refers to compounds having a halogen atom bound to a strongly electronegative atom such as oxygen, nitrogen, or another halogen, and capable of donating a positively charged halogen atom. Representative halogenating agents include sodium hypochlorite, calcium hypochlorite, chlorine, hypochlorous acid, bromine, hypobromous acid, aqueous chlorine solutions, aqueous bromine solutions, N-chlorosuccinimide, sodium hypobromite, pyridinium bromide perbromide, N-bromosuccinimide, chloramine-T, chlorhexadine, biguanides, dichlorodimethylhydantoin, bromochlorodimethylhydantoin, dibromodimethylhydantoin, dichloroisocyanurate, trichloroisocyanurate, and combinations thereof. Other suitable halogenating agents will be readily apparent to those skilled in the art.

Submicron particulate refers to any particulate of matter being smaller than 1 micron (1/1,000,000 of a meter). Embodiments of the present invention can remove particulates in the range of about 0.5 microns to less than 1 micron. Embodiments of the present invention can remove particulates in the range of about 0.2 microns to less than 0.5 microns. Embodiments of the present invention can remove particulates in the range of about 0.3 microns to less than 0.5 microns. Embodiments of the present invention can remove particulates in the range of about 0.2 microns to about 3 microns. Typically, submicron particulates are negatively charged materials. Submicron particulates normally present in swimming pools, and other waters, which can be removed with embodiments of the present invention, include bacteria, such as *E. coli, Legionella pneumophila, Staphylococcus aureus,* and *Pseudomonas aeruginosa.* Embodiments of the present invention can also remove nonpolar hydrocarbons, amphoteric hydrocarbons, and polar hydrocarbons, such as those present in skin creams, moisturizers, and suntan lotions that are released into recreational waters by bathers, and certain types of oils or fatty acids such as those found in cellular membranes, having a hydrophilic (water compatible) portion and a hydrophobic (water incompatible) portion. These materials may result in colloidal suspensions or micelles in the water and can reduce the clarity of the water, if not removed.

The method according to the invention for removing submicron particulates from water that contains a halogenating agent includes adding a soluble, cationic polymer to the water, allowing for a period of time for dispersal of the soluble, cationic polymer throughout the water, followed by adding a soluble, anionic polymer or anionic salt. A suitable soluble, cationic polymer is chitosan acetate. A suitable soluble, anionic polymer is alginate. A suitable soluble, anionic salt is sodium sulfate. The amount of halogenating agent in the water is preferably in the range of about 1 ppm to about 50 ppm by weight. More preferably, the halogenating agent is in the range of about 2 ppm or about 3 ppm to about 20 ppm by weight. Preferably, prior to addition to the water, the soluble, cationic polymer is dissolved in an acidic solvent to increase the positively charged sites that can bond to submicron particulates. The situation of a halogenating agent already being present in water occurs in the context of swimming pools, spas, water parks, hot tubs. Typically halogenating agents will be present in water that is treated on a routine basis.

One embodiment of the invention relates to a water clarifying kit containing a first and second container with respective first and second solutions of water treatment chemicals, wherein the first water treatment chemical includes a solution of a soluble, cationic polymer, and the second water treatment chemical includes a solution of a soluble, anionic polymer or anionic salt. The kit may further include instructions on the use of the first and second treatment chemicals. According to the invention, it is preferred that the treatment chemical containing a soluble, cationic polymer is first added to the water containing a halogenating agent. It is preferred to allow the soluble, cationic polymer to be dispersed throughout the water, before addition of the soluble, anionic polymer or anionic salt. Efficient dispersal can take about 4 to 8 hours or longer. Dispersal of the soluble, cationic polymer will depend on the system to be treated. For example, for commercial users, the first and second chemical may be injected continuously or semi-continuously with metering pumps into water distribution lines, before or after filters, or before or after water pumps that may help to increase the dispersal in the water. For example, metering pumps (peristaltic or diaphragm pumps) with timers provide a consistent dosage. Timers can be built into or external to the pump, or pumps can be wired to a controller with timer capabilities. The first and second chemicals can be added to water in a pipe leading to the water to be treated to allow for effective mixing. Preferably, the velocity of the water in the pipe is turbulent to allow for mixing to take place in a pipe. Alternatively, for home users, the first soluble, cationic polymer may be dispersed by a "broadcast" method of dispersal, such as by pouring the cationic polymer from the container at various locations of the swimming pool. The second soluble, anionic polymer or anionic salt, may likewise be distributed by a broadcast method, after a period of time has been allowed for sufficient dispersal of the first soluble, cationic polymer. The home user can usually expect to wait about 4 hours after addition of the first soluble, cationic polymer before adding the second soluble, anionic polymer or anionic salt. The commercial user can typically expect to wait about 8 hours after addition of the first soluble, cationic polymer before adding the second soluble, anionic polymer or anionic salt. For commercial users, the metering pumps can be set to sequentially inject the chemicals at a pre-specified time schedule and at pre-specified flow rates.

Representative soluble, anionic, polyelectrolyte flocculant polymers, include alginate, sodium hexametaphosphate, sodium carboxymethylcellulose, pectin, polyacrylic acid, anionic polysaccharides, carrageenan, and polyacrylamide. Preferably, the polymer selected to be added to the water after the addition of the soluble, cationic polymer is both soluble and anionic. A soluble polymer is preferable to avoid sediment throughout the system. Preferably, the negatively-charged, anionic, polyelectrolyte polymer, such as alginate, will combine with the positively-charged, cationic, polyelectrolyte polymer, such as chitosan (bound to the submicron particulates) to form a polyelectrolyte complex of large flocs containing aggregates of submicron particulates that can then be removed from the water by entrapment on a filter. This is particularly effective for filters with larger nominal pore sizes. A suitable level of a soluble, anionic, polyelectrolyte flocculant, such as alginate, in water is about 5 ppb to about 100 ppm by weight.

The present invention produces stabilized flocs of submicron particulates with a cationic polymer and an anionic polymer or anionic salt that can then be run through the existing filters installed in the water treatment system. Such filters can include sand filters, cartridge filters, and diatomaceous earth filters. The flocs of submicron particulates with cationic polymer and an anionic polymer or anionic salt are stable under conditions of high water flow rates or velocities that may be encountered in swimming pool, hot tub, water park, spa, or any halogen-containing water. "Stable" or "stabilized" floc refers to the ability of a floc to substantially remain intact to allow a majority of the floc to be removed through filtration under turbulent conditions or high velocities that are encountered in swimming pool, spa, hot tub, water park, potable and nonpotable water filtration systems. Suitable levels of soluble, cationic polymer, such as chitosan, to cause flocculation of submicron particulates in water are about 5 ppb to about 100 ppm by weight.

In another embodiment of the present invention, a coagulant can be added to the water, before, after or during addition of the chitosan. Representative coagulants include inorganic aluminum or ferric salts, such as ferric or aluminum sulfate or chloride. Suitable levels of coagulant in the water are about 50 ppb to about 100 ppm by weight.

Another aspect of the present invention is related to a method for removing small dirt particles and organic material that consumes chlorine and produces chloramines, which are believed responsible for odors and irritation to human skin. The present invention has the capability of flocculating particles whose size distribution is represented by a bell curve. After application of the first and the second polymers, the bell curve is shifted to represent a distribution of particle sizes having a greater median particle size, signifying that the smaller particles have been flocculated.

Another aspect of the present invention relates to reducing the turbidity of water treated with the first and the second polymers. Particles that contribute to high turbidity include, for example, silt, organic matter, dust and pollen, suntan oils, lotions, minerals, and metals. The present invention has the ability to reduce turbidity 0.5 NTU (nephelometric turbidity units) within one turnover rate, or six hours, from an initial reading of 1.0 NTU.

The FIGURE illustrates a graph of the decrease of turbidity in accordance with one embodiment of the present invention. At time equals 0 (zero), the turbidity of the water is at the baseline value before the addition of a material that contributes to the spike in turbidity seen at time equals 30 minutes. At 30 minutes, the turbidity has spiked to about 5.5 NTU. Within about 2 hours after the spike in turbidity at 2:30 hours, the turbidity is seen to be reduced by about half of the spiked value to about 2.75 NTU. Within about another 2.5 hours at 5:00 hours, the turbidity is seen to again be reduced by about half of the previous value to about 1.33 NTU. In this embodiment, the turbidity can be reduced by about half an initial starting value in about two to three hours.

Example 1

Demonstration of Increased Floc Size Using Both Chitosan and Alginate in Water Containing a Halogenating Agent One liter of deionized water was mixed with about 0.03-0.08 grams of dichlor (a chlorine source). A small drop (~0.02 grams) of NIVEA lotion or 2 grams of a solution consisting of 0.1 gram NIVEA lotion in 9.9 grams of distilled water was then added to the 1 liter of water containing dichlor. A cloudy solution develops upon mixing. Control water contained all ingredients except dichlor (chlorine source). SEA-KLEAR for spas (0.5% chitosan and 0.5% acetic acid in water wt./wt.) was then added dropwise (10 drops ~0.4 grams) to the test solution and allowed to mix for about 2-5 minutes. Mixing was stopped and small flocs formed within ~5 minutes in the dichlor-containing water but not the control water that did not contain dichlor. Mixing was started again and 1 drop (0.04 gram) of a 1% (wt./wt.) sodium alginate in water solution was added. Solution was mixed for about 2-5 minutes, stopped and floc size was measured. Floc size increased in comparison to the same solution without sodium alginate. Control solutions without chlorine did not form flocs.

| Dichlor Presence (chlorine source) | Chitosan (Primary Flocculant) | Alginate (Secondary Flocculant) | Floc Size (nominal) |
|---|---|---|---|
| Yes | Yes | Yes | 2,000-4,000 microns |
| Yes | Yes | No | 500 microns |
| No | Yes | Yes | None |
| No | Yes | No | None |

Results demonstrate that addition of a secondary anionic polymer flocculant to a solution containing chitosan, chlorine and NIVEA lotion can increase the size of flocculated material, which is not observed in non-chlorine containing water.

Example II

A solution of simulated pool water was made by adding 0.101 g NaHCO₃, 0.441 g CaCl₂, and 50 microliters of Ultra Clorox bleach to one liter of tap water. Ten milliliters of 6% bentonite clay was added to the simulated pool water. The resulting solution was filtered through 1.6 micron pore size glass fiber filter, followed by filtration through a 0.45 micron pore size cellulose nitrate filter. A portion (250 mL) of this solution was bottled for particle size analysis. A second portion (250 mL) of this was treated with the particle removal system, having one solution containing the first stage polymer (chitosan) and a second solution containing the second stage polymer (sodium alginate.) This sample was placed in a bottle. The two bottled samples were sent to Delta Analytical Instruments, Inc. where they were analyzed using a Horiba LA-920 laser scattering particle size distribution analyzer. The following results show an increase in the mean diameter of the particles.

| | Bentonite Clay Filtered Thru 0.45 μm Cellulose Nitrate | |
|---|---|---|
| | Untreated | Treated |
| mean size, μm | 0.76 | 24.1 |
| median size, μm | 0.76 | 20.4 |
| Std Dev (μm) | 0.33 | 13.3 |
| 3% of particles are less than (μm) | 0.22 | 8 |
| % of particles less than 0.5 μm | 21 | 0 |
| % of particles greater than 30 μm | 0 | 26.2 |

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for removing submicron particulates from water containing a halogenating agent, comprising:
    (a) adding chitosan to water comprising submicron particulates and a halogenating agent to provide chitosan-treated water;
    (b) adding a soluble, anionic polymer comprising alginate to the chitosan-treated water to provide polymer-treated water;
    (c) allowing flocs comprising submicron particulates to form in the polymer-treated water; and
    (d) filtering the flocs to remove the submicron particulates from the water.

2. The method of claim 1, wherein the chitosan is in solution when added to the water.

3. The method of claim 2, wherein the solution comprises acetic acid.

4. The method of claim 1, further comprising adding at least one of sodium hexametaphosphate, sodium carboxymethylcellulose, pectin, polyacrylic acid, anionic polysaccharide, carrageenan, or polyacrylamide.

5. The method of claim 4, wherein the polymer concentration in the water is about 5 ppb to about 100 ppm by weight.

6. The method of claim 1, wherein the water is in a swimming pool, spa, water park, or hot tub.

7. The method of claim 1, comprising filtering the flocs in at least one of a sand, cartridge, or diatomaceous earth filter.

8. The method of claim 1, further comprising adding an inorganic aluminum coagulant.

9. The method of claim 8, wherein the inorganic aluminum coagulant is aluminum sulfate or polyaluminum chloride.

10. The method of claim 8, wherein the inorganic aluminum coagulant concentration in the water is about 50 ppb to about 100 ppm by weight.

11. The method of claim 1, further comprising adding a ferric salt coagulant to the water.

12. The method of claim 11, wherein the ferric salt coagulant is ferric sulfate or ferric chloride.

13. The method of claim 11, wherein the ferric salt coagulant concentration in the water is about 50 ppb to about 100 ppm by weight.

14. The method of claim 1, wherein the chitosan concentration in the water is about 5 ppb to about 100 ppm by weight.

15. The method of claim 1, wherein the halogenating agent comprises at least one of sodium hypochlorite, calcium hypochlorite, chlorine, hypochlorous acid, bromine, hypobromous acid, N-chlorosuccinimide, sodium hypobromite, pyridinium bromide, perbromide, N-bromosuccinimide, chloramine-T, chlorhexadine, dichlorodimethylhydantoin, bromochlorodimethylhydantoin, dibromodimethylhydantoin, dichloroisocyanurate, or trichloroisocyanurate.

16. The method of claim 1, wherein the halogenating agent concentration in the water is about 1 ppm to about 50 ppm by weight.

17. The method of claim 1, wherein the halogenating agent concentration in the water is about 2 ppm to about 20 ppm by weight.

18. The method of claim 1, wherein the submicron particulates further comprise a nonpolar hydrocarbon.

19. The method of claim 1, wherein the submicron particulates further comprise oil.

20. The method of claim 1, wherein the submicron particulates include particles in the range from about 0.5 microns to less than 1 micron.

21. The method of claim 1, wherein the submicron particulates include particles in the range of from about 0.3 microns to less than 0.5 microns.

22. The method of claim 1, wherein the submicron particulates include particles in the range of from about 0.2 microns to about 0.3 microns.

23. The method of claim 1, wherein the submicron particulates include particles less than 0.5 microns.

24. The method of claim 1, wherein step (b) follows step (a).

25. The method of claim 1, wherein step (b) is performed about 4 hours to about 8 hours after performing step (a).

26. The method of claim 1, wherein the water comprises a biguanide.

27. A method for clarifying water, comprising:
to water containing about 2 ppm to about 20 ppm by weight of a halogenating agent and submicron particulates, adding chitosan to reach a concentration in the water of about 5 ppb to about 100 ppm by weight;
followed by adding to the water, a soluble, anionic polymer comprising alginate to reach a concentration in the water of about 5 ppb to about 100 ppm by weight; and
filtering the water to remove flocs comprising submicron particulates, to clarify said water.

28. A method for clarifying water, comprising:
to water containing about 2 ppm to about 20 ppm by weight of a halogenating agent and submicron particulates, adding a soluble, cationic polymer comprising chitosan to reach a concentration in the water of about 5 ppb to about 100 ppm by weight;
followed by adding to the water, a soluble, anionic polymer or anionic salt comprising alginate to reach a concentration in the water of about 5 ppb to about 100 ppm by weight; and
filtering the water to remove flocs comprising submicron particulates, to clarify said water.

29. A method for removing submicron particulates from water, comprising:
adding a soluble, cationic polymer comprising chitosan to water containing a halogenating agent and submicron particulates;
allowing dispersal of the soluble, cationic polymer to occur in the water;
followed by adding a soluble, anionic polymer or anionic polymer salt comprising alginate to the water; and
filtering the water to remove flocs comprising submicron particulates.

30. A method for clarifying water in a swimming pool, comprising:
adding a soluble, cationic polymer comprising chitosan to water containing submicron particulates in a swimming pool;
allowing the soluble, cationic polymer to disperse throughout the water in the swimming pool;
followed by adding a soluble, anionic polymer or anionic salt comprising alginate to the water in the swimming pool; and
filtering the water of the swimming pool to remove the flocs comprising submicron particulates formed from the cationic polymer and the anionic polymer, to clarify said water.

* * * * *